United States Patent [19]

Davies

[11] Patent Number: 5,112,498
[45] Date of Patent: May 12, 1992

[54] METHOD OF COALESCING A DISPERSE PHASE WITHIN A CONTINOUS PHRASE OF A FLUID MIXTURE

[75] Inventor: Simon R. H. Davies, Edinburgh, Scotland

[73] Assignee: Orkney Water Test Centre Limited, England

[21] Appl. No.: 619,221

[22] Filed: Nov. 28, 1990

[30] Foreign Application Priority Data

Nov. 28, 1989 [GB] United Kingdom ............... 8926890

[51] Int. Cl.$^5$ ................................................ C02F 1/38
[52] U.S. Cl. ........................................ 210/708; 55/1; 210/738; 210/788; 210/DIG. 5
[58] Field of Search ............... 210/702, 738, 787, 788, 210/801, 804, 512.1, DIG. 5, 708; 55/1, 261

[56] References Cited

U.S. PATENT DOCUMENTS

| | | | |
|---|---|---|---|
| 2,010,435 | 8/1935 | Matheson | 210/512.1 |
| 2,967,618 | 1/1961 | Vane | 210/801 |
| 2,981,413 | 4/1961 | Fitch | 210/512.1 |
| 3,064,811 | 11/1962 | Mumper | 55/261 |
| 3,396,511 | 8/1968 | Fracke et al. | 55/261 |
| 3,595,392 | 7/1971 | Markel | 210/73 |
| 3,720,314 | 3/1973 | Phillippi | 55/261 |
| 4,350,596 | 9/1982 | Kennedy, Jr. | 210/708 |
| 4,544,486 | 10/1985 | Carroll | 210/788 |
| 4,555,332 | 11/1985 | Francis | 210/DIG. 5 |
| 4,600,410 | 7/1986 | Baillie et al. | 55/1 |
| 4,726,686 | 2/1988 | Wolf et al. | 210/512.1 |

FOREIGN PATENT DOCUMENTS

| | | |
|---|---|---|
| 1159739 | 7/1969 | United Kingdom . |
| 1413018 | 11/1975 | United Kingdom . |
| 2167689 | 6/1986 | United Kingdom . |

Primary Examiner—Peter Hruskoci
Attorney, Agent, or Firm—Ostrolenk, Faber, Gerb & Soffen

[57] ABSTRACT

A method of coalescing a disperse phase within a continuous phase of a fluid mixture comprising the steps of:
(a) supplying said fluid mixture to a primary inlet of a coalescing device;
(b) passing said fluid mixture from said primary inlet to a substantially cylindrical chamber of said coalescing device, said primary inlet being arranged substantially radially of said chamber;
(c) introducing a fluid to said chamber via a secondary inlet of said coalescing device, said secondary inlet being arranged substantially tangentially to said chamber, thereby setting said fluid mixture into rotating motion within said chamber; and
(d) allowing said fluid and said fluid mixture to exit said chamber via an outlet of said coalescing device having a longitudinal axis arranged coaxially with said chamber, such that said exiting fluid and fluid mixture are caused to spin about said longitudinal axis to cause coalescing of said disperse phase.

9 Claims, 1 Drawing Sheet

METHOD OF COALESCING A DISPERSE PHASE WITHIN A CONTINOUS PHRASE OF A FLUID MIXTURE

FIELD OF THE INVENTION

The invention relates to a method of coalescing a disperse phase within a continuous phase of a fluid mixture particularly, but not exclusively, for coalescing oil droplets in oily water.

BACKGROUND OF THE INVENTION

Many processes that involve the separation of a disperse fluid phase from a continuous fluid phase utilize a control valve, e.g. for regulating flow, pressure, level, etc. Such valves, e.g. globe, gate and butterfly type valves, are usually situated upstream of the separation equipment and cause shearing of the disperse phase droplets prior to their entry into the separation equipment. The separation equipment thus has to be capable of separating droplets of reduced size if it is to operate effectively, particularly if the separation equipment operates on the basis of Stokes' Law (e.g. gravity settling equipment).

An object of the invention is to provide a method of coalescing a disperse phase within a continuous phase in order to facilitate separation.

SUMMARY OF INVENTION

The invention provides a method of coalescing a disperse phase within a continuous phase of a fluid mixture, comprising the steps of:
 (a) supplying said fluid mixture to a primary inlet of a coalescing device:
 (b) passing said fluid mixture from said primary inlet to a substantially cylindrical chamber of said coalescing device, said primary inlet being arranged substantially radially of said chamber;
 (c) introducing a fluid to said chamber via a secondary inlet of said coalescing device, said secondary inlet being arranged substantially tangentially to said chamber, thereby setting said fluid mixture into rotating motion within said chamber; and
 (d) allowing said fluid and said fluid mixture to exit said chamber via an outlet of said coalescing device having a longitudinal axis arranged coaxially with said chamber, such that said exiting fluid and fluid mixture are caused to spin about said longitudinal axis to cause coalescing of said disperse phase.

Spinning of the fluid mixture about the longitudinal axis of the outlet encourages the droplets of the disperse phase to coalesce, either at the walls of the outlet or at the center of the outflow, depending on whether the disperse phase material is of higher or lower density than the continuous phase material.

The above method also allows the flow or pressure of the fluid mixture to be regulated as well as encouraging coalescence of the disperse phase droplets. Thus the shearing of the disperse phase droplets which occurs in conventional regulating methods is avoided, thereby enhancing the coalescing effect achieved.

Such a method thus coalesces the disperse phase particles of the fluid mixture and facilitates separation of the disperse and continuous phases later in the method.

Preferably, the disperse phase is caused to coalesce along the longitudinal axis of the outlet. The fluid mixture utilized is preferably oily water and the fluid is preferably water.

Preferably, the outlet is shaped to cause an increase in the rotational speed of the fluid and fluid mixture within the outlet.

BRIEF DESCRIPTION OF THE DRAWINGS

An embodiment of the invention will now be described by way of example only with reference to the accompanying drawing, wherein.

DETAILED DESCRIPTION OF THE DRAWINGS

Figure 1:
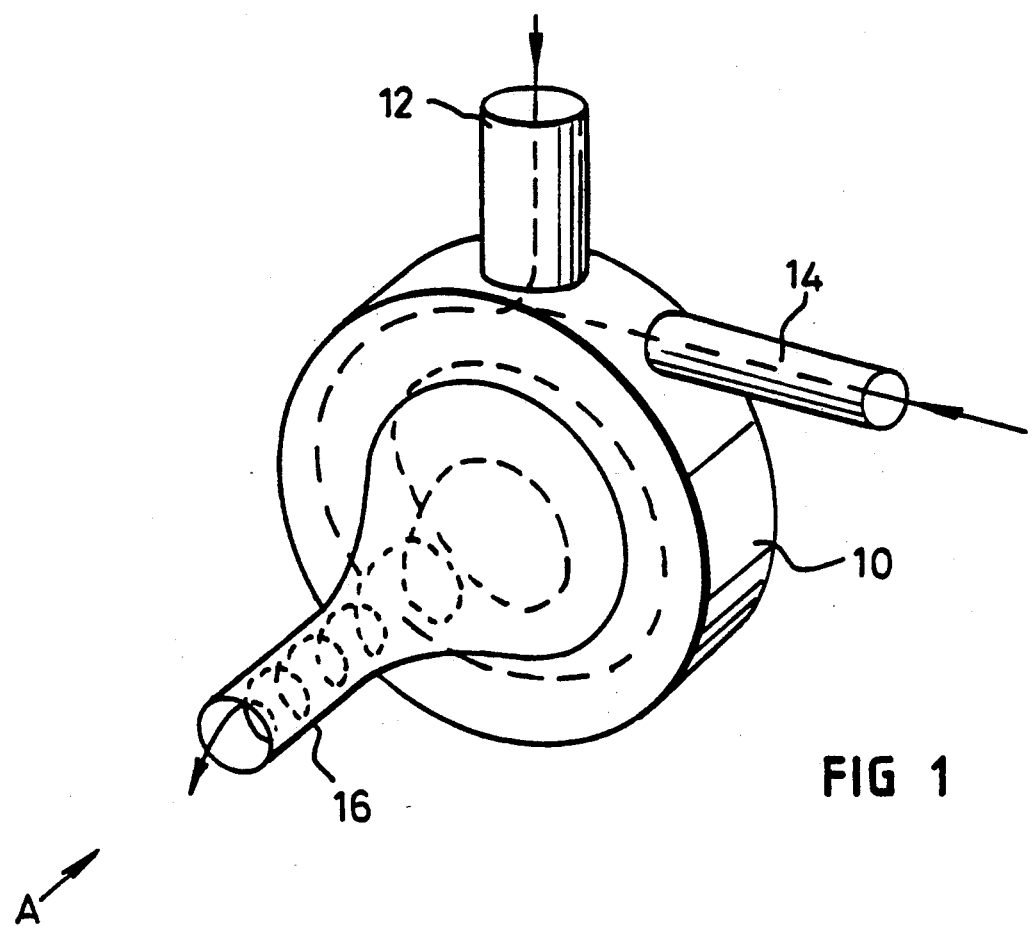
FIG. 1 is a perspective view of a device being operated in accordance with a method according to the invention.

The device of FIG. 1 has a substantially cylindrical chamber 10, communicating with which are a primary inlet 12, a secondary inlet 14 and an outlet 16. In the absence of any fluid entering the chamber via the secondary inlet 14, fluid entering the chamber via the primary inlet 12 can exit via the outlet 16 without acquiring any spin. However, once fluid is introduced via the secondary inlet 14, fluid entering the chamber 10 via the primary inlet 12 is deflected into a rotating motion and exits via the outlet 16 spinning along the axis of the outlet 16.

The outlet 16 has an arcuate profile over at least part of its length so that the rotation of the fluid which passes from the chamber 10 into the outlet 16 is increased in speed in a controlled manner. The shape of the outlet 16 will dictate the maximum rotation speed of the fluid passing there along. The profile of the outlet 16 can, of course, be varied to suit particular needs.

The introduction of a flow of fluid along the secondary inlet 14 is used to regulate the pressure drop between the primary inlet 12 and the outlet 16 and/or the flow along the primary inlet 12. By increasing the flow along the secondary inlet 14, the pressure drop can be increased and/or the inlet flow can be decreased. When the secondary inlet 14 carries a flow of approximately 5% by Volume of the maximum primary flow, the primary flow can be effectively cut off, thus maximizing the pressure drop and minimizing the primary flow.

Figure 2:
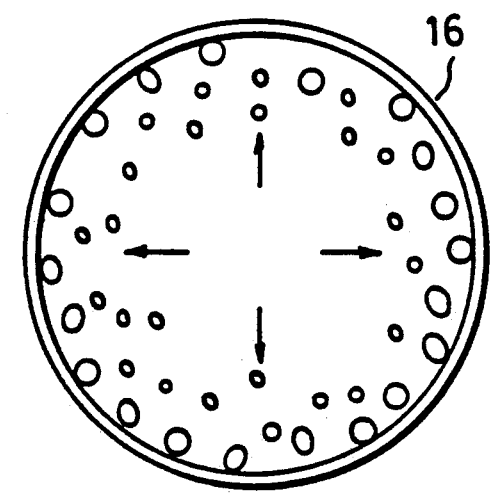
FIGS. 2 and 3 are end views of the outlet of the device shown in FIG. 1 taken along arrow A and showing operation when the disperse phase is (a) denser and (b) less dense than the continuous phase of the fluid mixture.
Figure 3:
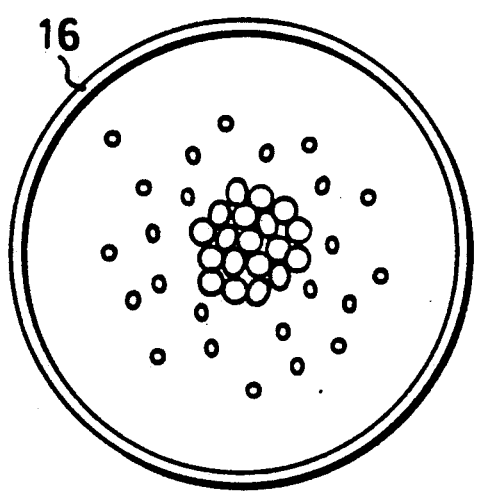

The fluid mixture which passes along the outlet 16 of the device is spinning about the longitudinal axis of the outlet 16. The phase (disperse or continuous) having the higher density is thus forced towards the walls of outlet 16. When the disperse phase is of higher density than the continuous phase, the droplets of the disperse phase will accumulate at the walls of the outlet 16 where they will be encouraged to coalesce under the continuing pressure of the centrifugal forces. When the disperse phase is of lower density than the continuous phase, as is the case with oily water, the droplets of the disperse phase will be displaced towards the center of the outlet 16 by movement of the heavier continuous phase towards the walls. Thus the droplets of the lighter disperse phase are forced together and encouraged to coalesce in this way. These situations are shown schematically in FIGS. 2 (a) and 2 (b) respectively.

Once the fluid mixture has passed through the coalescing device it can be passed to a separator wherein the disperse phase particles are separated from the continuous phase. Since the average droplet size of the disperse phase is larger than would have been the case if no coalescing device had been utilized, the separator is able to achieve higher attenuation. The resulting fluid is therefore separated more cleanly into its two distinct phases. In the case of oily water, the resulting fluid is cleaner water which, for convenience, can be used to supply the secondary fluid inlet of the coalescing device if desired.

The device described above has the added advantage of utilizing no moving parts. It therefore requires virtually no maintenance and has an extended working life. The device acts as a regulator and coalescer which enhances separation. The method described above is particularly suitable for, although not limited to, use in separation of oily water. As indicated above, one of the separated fluids can supply the secondary inlet of the device; however any other suitable fluid could be used.

The invention is not limited to details of the embodiment described above, but encompasses all variations and alternatives which would be apparent to one skilled in the art.

I claim:

1. A method of coalescing a disperse phase within a continuous phase of a fluid mixture comprising the steps of:
   (a) supplying said fluid mixture to a primary inlet of a coalescing device;
   (b) passing said fluid mixture from said primary inlet to a substantially cylindrical chamber of said coalescing device, said primary inlet being arranged substantially radially of said chamber;
   (c) introducing a fluid to said chamber via a secondary inlet of said coalescing device, said secondary inlet being arranged substantially tangentially to said chamber, thereby setting said fluid mixture into rotating motion within said chamber; and
   (d) allowing said fluid and said fluid mixture to exit said chamber via an outlet of said coalescing device having a longitudinal axis arranged coaxially with said chamber, such that said exiting fluid and fluid mixture are caused to spin about said longitudinal axis to cause coalescing of said disperse phase.

2. A method as claimed in claim 1, wherein said disperse phase is caused to coalesce along said longitudinal axis of said outlet.

3. A method as claimed in claim 2, wherein said fluid mixture is oily water.

4. A method as claimed in claim 2, wherein said fluid is water.

5. A method as claimed in claim 1, wherein said outlet is shaped to cause an increase in the rotational speed of said fluid and fluid mixture within the said outlet.

6. A method as claimed in claim 1, wherein said fluid and fluid mixture are passed from said outlet to a separating device for separating said disperse phase from said continuous phase.

7. A method as claimed in claim 1, further comprising the step of simultaneously regulating the flow of the fluid mixture by increasing or decreasing the flow along said secondary inlet.

8. A method as claimed in claim 7, wherein increasing the flow along said secondary inlet enables an increase in the pressure drop between the primary inlet and the outlet or a decrease int he flow along the primary inlet or a combination thereof.

9. A method as claimed in claim 1, wherein said coalescing is accomplished by said coalescing device without any moving parts.

* * * * *